Jan. 9, 1968  J. H. HERSHEY ETAL  3,363,249
X-BAND R.F. TEST SET EMPLOYING A SINGLE TUNING CONTROL
Filed Dec. 14, 1965  4 Sheets-Sheet 1

John H. Hershey
Frank W. Jarvis, Jr.
INVENTORS.

BY Harry M. Saragovitz
Edward J. Kelly
Herbert Berl
Robert C. Sims

John H. Hershey
Frank W. Jarvis, Jr.
INVENTORS.

John H. Hershey
Frank W. Jarvis, Jr.,
INVENTORS.

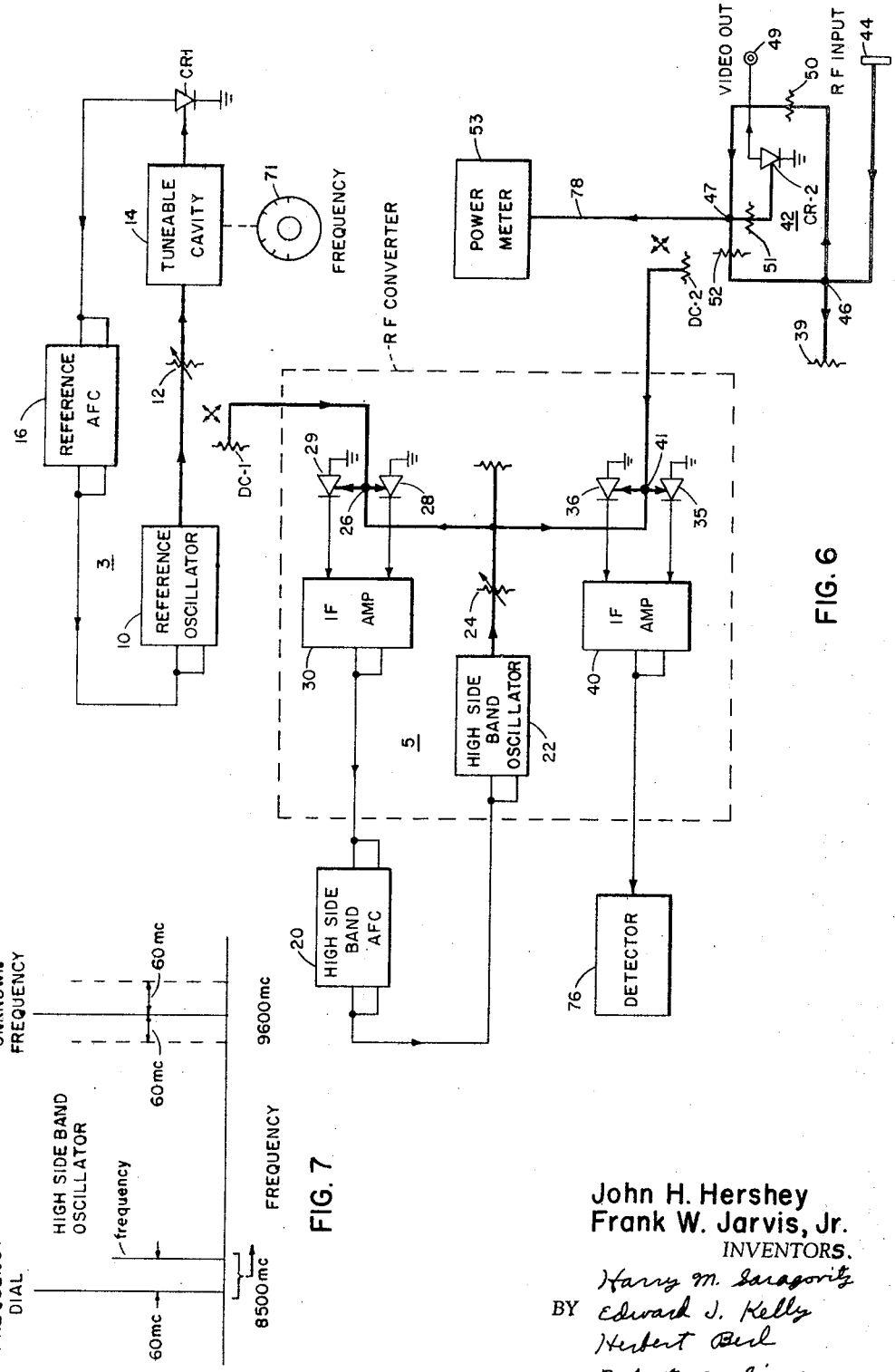

United States Patent Office 3,363,249
Patented Jan. 9, 1968

3,363,249
X-BAND R.F. TEST SET EMPLOYING A
SINGLE TUNING CONTROL
John H. Hershey, Las Cruces, N. Mex., and Frank W.
Jarvis, Jr., Burlington, N.C., assignors, by mesne assignments, to the United States of America as represented
by the Secretary of the Army
Filed Dec. 14, 1965, Ser. No. 513,871
17 Claims. (Cl. 343—17.7)

ABSTRACT OF THE DISCLOSURE

A system for transmitting and receiving either pulsed or C.W. signals in the 8500 to 9600 megacycles per second range. A tunable cavity is the single tuning control and is coupled to a variable reference oscillator. Current flow through the cavity is sensed by an A.F.C. which is connected to control the frequency output of the oscillator. High and low side band A.F.C.'s couple the output of the oscillator to various loads.

---

The equipment of the prior art test sets are subject to one or more of the following deficiencies:

(1) Frequency adjustments require simultaneous manipulation of two or more controls resulting in excessive set-up time.

(2) A high degree of operator skill is required.

(3) Excessive warm-up time is mandatory for stable calibrated operation.

(4) Frequency accuracy is insufficient.

(5) Operation on both a C.W. and pulse bases is not available.

(6) Measurement of power below one milliwatt is not possible.

(7) Input power meter use is not provided.

(8) No video detector is provided.

(9) Use as a frequency meter is not possible.

The X-band R.F. test set of this invention was made to overcome the above deficiencies. Special consideration was given to the simplification of operation, thereby reducing the operator skill required. Means were also provided making it possible to rapidly establish the desired calibrated frequency and power level. This test set is best described in terms of its frequency determining, receiving transmitting and power measuring circuits. The single tuning control selects the desired frequency by tuning a transmission type tunable cavity. This control is calibrated directly in megacycles per second, and is readable to better than one megacycle. The circuit Q of the tunable cavity is 10,000; thereby making the halfpower bandwidth one megacycle wide. Since the output of the reference oscillator is included to reduce the frequency modulation present at the output. The use of the additional oscillator also makes it possible for the tunable cavity calibration to be direct reading and not displaced by the I.F. frequency. However, this intermediate oscillator referred to later as the "high side band oscillator" is used as the beat frequency oscillator when the test set is used as a receiver.

It is, therefore, an object of this invention to provide a test set which requires manipulation of only a single control.

Another object of the present invention is to provide a test set which will operate on both C.W. and pulse bases.

A further object of this invention is a test set which can be used as a power meter and as a frequency meter.

A still further object of the invention is to provide an X-band R.F. test set which can make power measurements below one milliwatt.

The invention further resides in and is characterized by various novel features of construction, combinations, and arrangements of parts which are pointed out with particularity in the claims annexed to and forming part of this specification. Complete understanding of the invention and an introduction to other objects and features not specificlly mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

Figure 2:
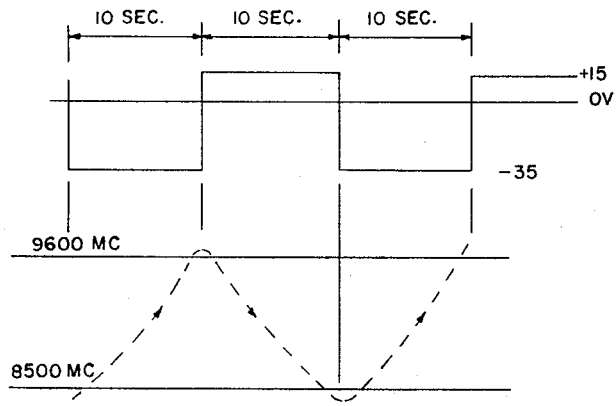
Figure 3:
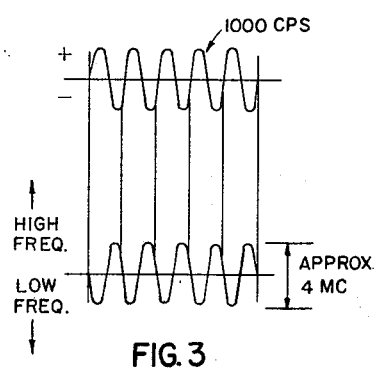
Figure 5:
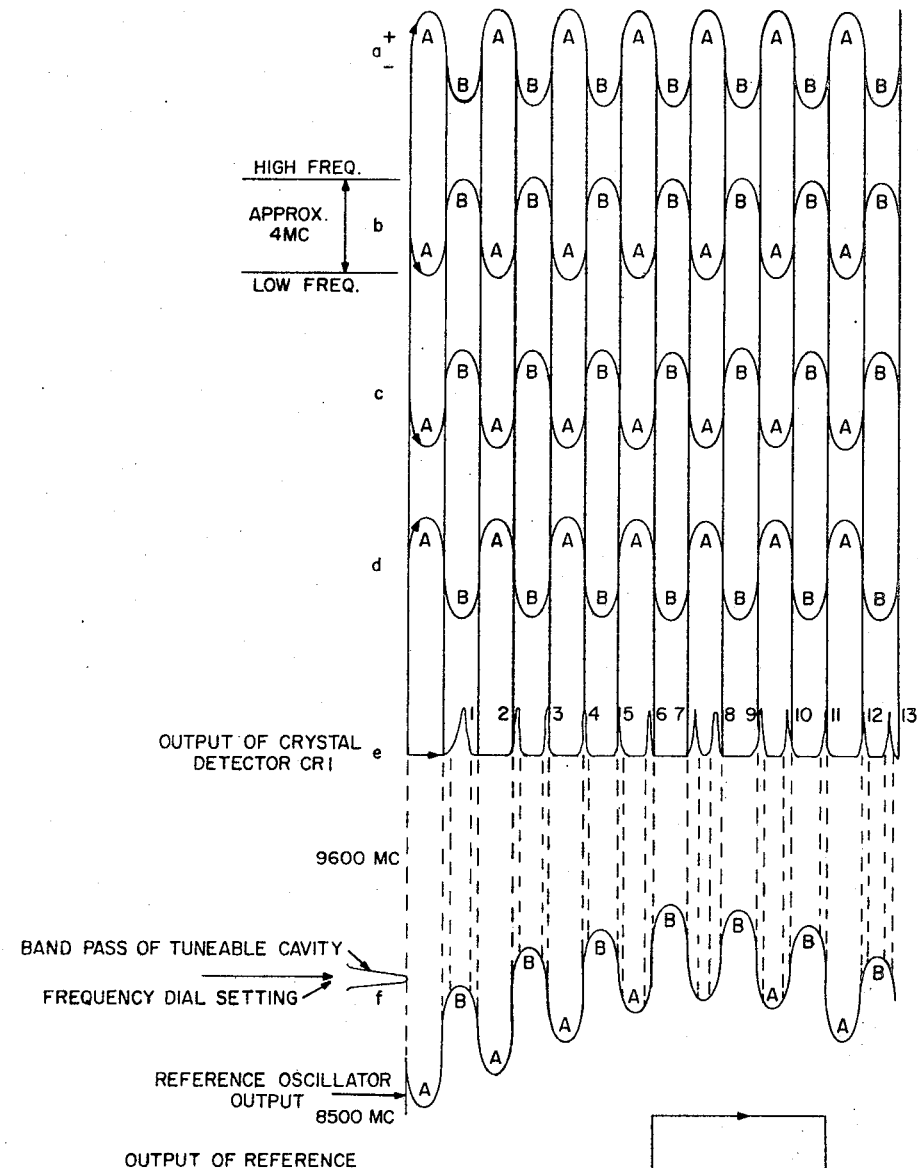
Figure 4:
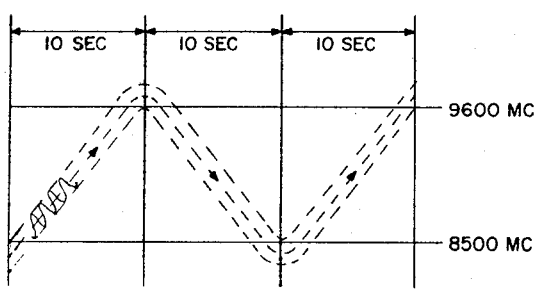

FIGURE 2 sets forth the waveforms of the reference A.F.C. multivibrator output and the resultant waveforms of the reference oscillator;

FIGURE 3 illustrates the waveforms of signals derived from the reference A.F.C. oscillator output and the waveform of the modulation placed on the reference oscillator;

FIGURE 4 illustrates the signal output of the reference oscillator due to the reference A.F.C. outputs;

FIGURE 5 illustrates the relationship of the signals of the reference oscillator and the reference A.F.C.;

FIGURE 6 is a block diagram showing of the system of the present invention in the receiving mode; and FIGURE 7 is a showing of the system for determining the frequency of the incoming signal.

Figure 1:
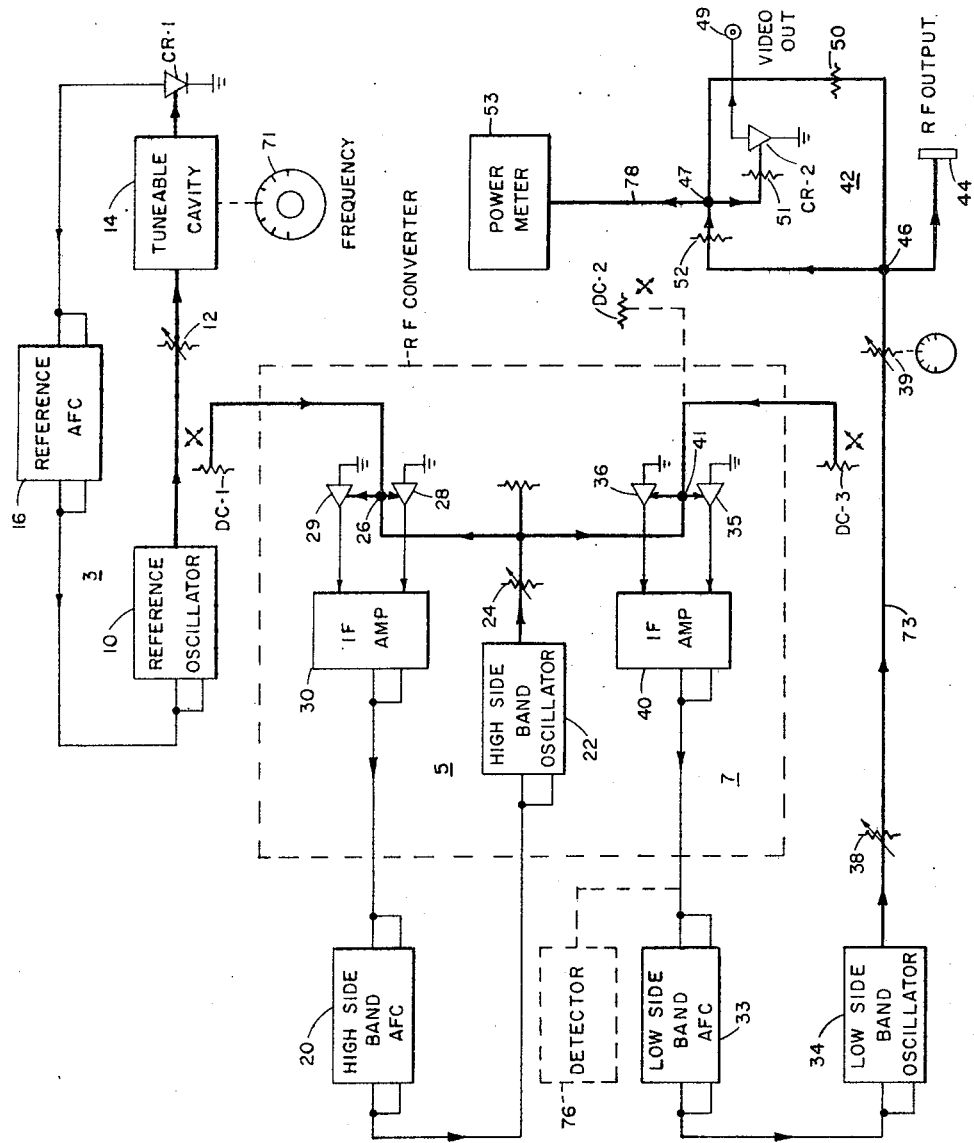
FIGURE 1 is a block diagram of the invention illustrating the transmitting mode of operation with the receiving circuit components shown in dotted.

The invention may be better understood with reference to the drawings and in order to better understand the operation of the system, a description of their components referred to its first presented. In FIGURES 1 and 6 the frequency determining circuits contain a reference oscillator circuit 3, a high side band oscillator circuit 5, and a low side band oscillator circuit 7. The reference oscillator circuit 3 consists of a reference oscillator 10, directional coupler DC–1, isolating attenuator 12, tunable cavity 14, a detector CR1, and a reference A.F.C. unit 16. The high side band oscillator circuit 5 has a high side band A.F.C. unit 20, high side band oscillator 22, variable attenuator 24, hybrid junction 26, crystal mixers 28 and 29, and I.F. amplifier 30. The low side band oscillator circuit 7 contains a low side band A.F.C. 33, directional coupler DC–3, low side band oscillator 34, crystal mixers 35 and 36, attenuators 38 and 39, hybrid junction 41, and I.F. amplifier 40.

A receiving and transmitting circuit 42 is shown in FIGURES 1 and 6. The receiving and transmitting circuit consists of R.F. receive-transmit unit 44, a hybrid junction 46 and 47, detector CR2, video out jack 49, attenuators 50, 51, and 52, power meter 53, and directional coupler DC–2.

Figure 1A:
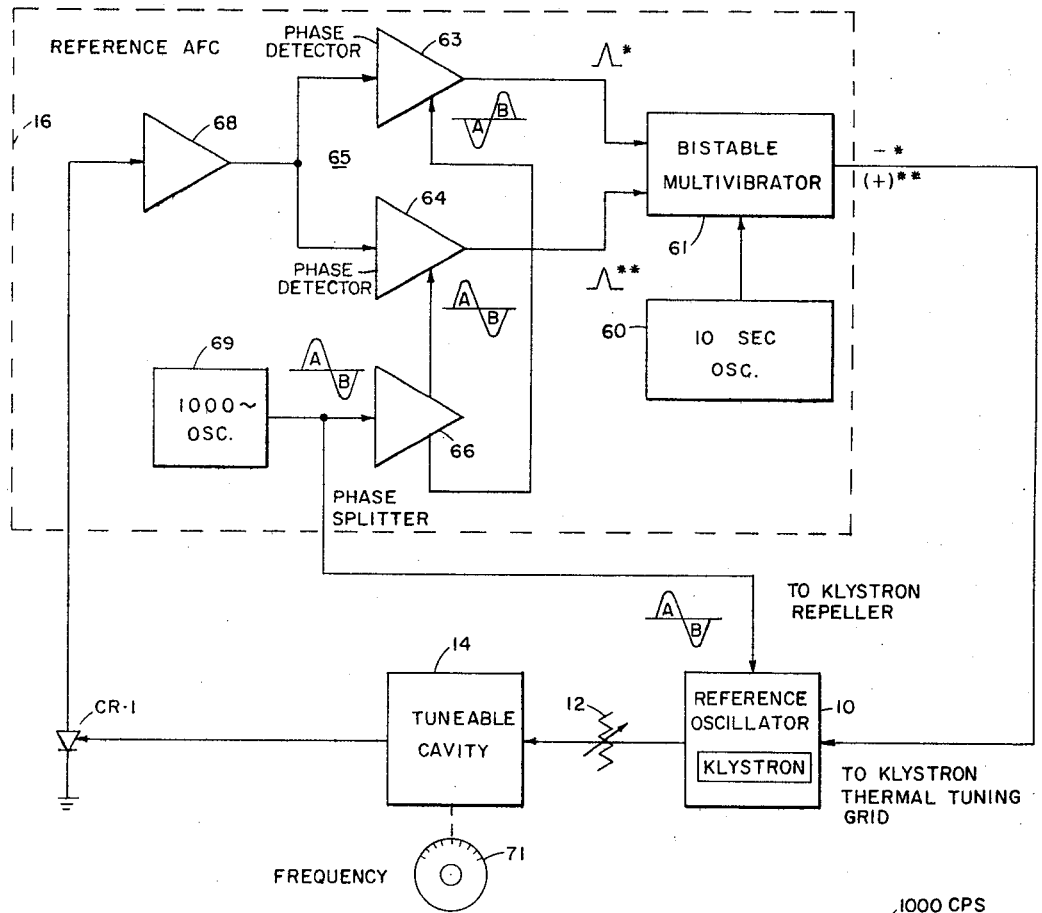
FIGURE 1A is a schematic representation of the reference A.F.C. and its connections to the reference oscillator.

The reference oscillator circuit 3 is shown in greater detail in FIGURE 1A. The reference A.F.C. 16 comprises a 10 second oscillator 60 having its output connected to a bistable multivibrator 61. The output of bistable multivibrator 61 is connected to the klystron thermal tuning grid of the reference oscillator 10; thereby causing the reference oscillator to make a frequency sweep. The bistable multivibrator is further controlled by outputs of phase detectors 63 and 64. Phase detectors 63 and 64 compare the phase of the outputs of phase splitter 66 with the output of the amplifier 68. A 1000 cycles per second oscillator 69 provides power for phase splitter 66 and provides an input to the klystron repeller of reference oscillator 10.

Reference oscillator 10 is subject to three controls: (1) The repeller is modulated by a sine wave having a frequency of approximately 1000 cycles per second. The amplitude of this signal is controllable and sets the R.F. deviation of the X-band output; (2) A frequency sweeping circuit 61 provided in the reference A.F.C. unit causes the reference oscillator R.F. output to pass through the frequency selected by tunable cavity 14; and (3) An automatic frequency control signal which is generated by comparing the phase of the 1000 cycle modulating signal and the signal obtained from the crystal detector CR1.

The 10 second oscillator 60 has an output which is a pulse at 10 second intervals. Due to the oscillator's connection to multivibrator 61, multivibrator 61 is caused to switch from one of its conditions to the other with each pulse. The output of this multivibrator with no signals from phase detectors 63 and 64 is shown in FIGURE 2 (upper curve). This output is applied to the thermal tuning grid of the reference oscillator and causes the output of reference oscillator 10 to change in the manner shown in the bottom curve of FIGURE 2. Note that when the output of the multivibrator is negative, the frequency of oscillator 10 increases, while a positive signal output of the multivibrator reduces the frequency output of the reference oscillator.

At the same time that reference A.F.C. multivibrator 61 is causing the reference oscillator's frequency to sweep over the X-band, the output of the 1000 cycles per second oscillator is applied to the repeller of oscillator 10 causing its output to be frequency modulated as indicated in FIGURE 3. The combined affect of the ten second and the 1000 cycle signals on the output of the reference oscillator is shown in FIGURE 4.

Automatic frequency control of the reference oscillator is accomplished by the use of phase detectors 63 and 64 of a comparing means 65. The 1000 cycle oscillator has its output coupled to phase splitter 66. Phase splitter 66 has two outputs: one essentially in phase with the signal applied to the repeller of the reference oscillator and a second which is displaced 180 degrees from the first. These two outputs are connected to the control grids of phase detectors 63 and 64. The phase detectors have further control grids which are connected to the output of an audio amplifier 68 which represents the output of reference oscillator 10. The phase detectors are constructed in such a manner that an output signal is generated only when both control grids of a particular phase detector are positive.

The circuit operation which occurs as the reference oscillator makes the transition from a "searching" condition, as indicated by FIGURE 4, to the frequency determined by the tunable cavity is best explained with reference to FIGURES 1A and 5. The 1000 cycle oscillator output, as indicated by curve $a$ of FIGURE 5, causes the frequency of reference oscillator 10 to vary as indicated in curves $b$ and $f$. The 1000 cycle is also coupled to the phase splitter which has two outputs shown in FIGURE 5: curve $c$ (the input to phase detector 63), and curve $d$ (the input to phase detector 64). With the output of multivibrator 61 at −35 volts (see first part of curve $g$) the frequency of reference oscillator 10 (curve $f$) is moving towards 9600 megacycles with the frequency deviation superimposed upon it by the oscillator 69. When the reference oscillator's output, curve $f$, passes through the frequency at which tunable cavity 14 is set, power passes through the cavity and is detected by detector CR1 as indicated by curve $e$ of FIGURE 5. Pulses 1, 2, 3, 4, and 5, of crystal detector CR1 (curve $e$) are positive at the same time that the input curve $c$ to phase detector 63 is positive; and pulses 1, 2, 3, 4, and 5 coincide with a negative input, curve $d$, of phase detector 64. Therefore, phase detector 63 will have a pulse output and detector 64 will not have an output.

An output of phase detector 63 will only cause the output of multivibrator 61 to go negative. An output of phase detector 64 will only cause the output of multivibrator 61 to go positive. This being the case, then during the time multivibrator is already negative, an output from phase detector 63 will not cause any change in the operating condition of the multivibrator 61. This is the case during pulses 1–5 of crystal detector CR1. However, pulse 6 is positive at the same time the input $d$ to phase detector 64 positive. This causes an output from detector 64 which will change the operating condition of the multivibrator so that its output goes positive as indicated in curve $g$ of FIGURE 5. The reference oscillator will not immediately reverse direction due to the thermal inertia of its tuning mechanism, but it will gradually reverse direction as indicated by curve $f$. Pulses 7–10 will not cause any change in the operation of the multivibrator as they only cause an output of phase detector 64, and since multivibrator 61 is now positive, an output of detector 64 will not change its operation. Pulse 11 of the crystal detector, as indicated by curves $c$ and $e$, coincides with the positive gate at phase detector 63. This causes detector 63 to generate an output which will reverse the operating condition of the bistable multivibrator 61 to a negative value, as indicated in curve $g$ of FIGURE 5. This causes the output frequency of the reference oscillator to increase and the operation repeats as described above. It can now be seen that reference oscillator 10 will center on the frequency selected by the setting on dial 71 of tunable cavity 14, because multivibrator 61 will be switched back and forth so that its average output will be a voltage that will cause the output of oscillator 10 to be at the selected frequency.

The high side band oscillator circuit 5, FIGURES 1 and 6 is coupled to the reference oscillator circuit 3 by way of directional coupler DC–1. Power from high side band oscillator 22 passes through variable attenuator 24 which sets the proper power level at crystal mixers 28 and 29. Power arriving at the hybrid junction divides with half going to each crystal mixer. A portion of the reference oscillator output is coupled through directional coupler DC–1 to the crystal mixers. The mixers have heterodyne outputs and are applied to a 60 megacycle I.F. amplifier 30. The output of amplifier 30 is applied to the high side band A.F.C. unit 20. Unit 20 operates similarly to the reference A.F.C. unit except that it has a 60 megacycle I.F. amplifier and frequency discriminator instead of the audio amplifier and phase detectors. The high side band A.F.C. functions to maintain the output of the high side band oscillator at a point 60 megacycles above the reference oscillator; therefore 60 megacycles above the setting of dial 71.

The low side band oscillator circuit 7 in FIGURE 1 provides the power for attenuator unit 38. A portion of the output of low side band oscillator 34 is coupled through directional coupler DC–3 to crystal mixers 35 and 36 where it heterodynes with the signal from the high side band oscillator 22. The output of the crystal mixers passes through the 60 megacycles I.F. amplifier 40 to the low side band oscillator A.F.C. unit, which operates similarly to the high side band unit, to keep the oscillator at a point 60 megacycles below the output of oscillator 22. Therefore, the output of the low side band oscillator is at the same frequency as that indicated by the calibrated frequency control dial 71.

The output of the low side band oscillator 34 passes through variable attenuator 38, wave guide 73, variable attenuator 39, and hybrid junction 46 to transmitter-receiver unit 44. Attenuator 38 is used as an isolating or masking attenuator to prevent "frequency-pulling" of the low side band oscillator due to the high standing wave ratio present when attenuator 39 is set near 0 db. Attenuator 38 is also used to set maximum output power level.

A portion of the output power passing through wave guide 73 is coupled through directional coupler DC–3 for automatic tuning of the oscillator as previously described. Attenuator 39 sets the output power level and has a continuous variable range of 0 to 35 db. Power arriving at hybrid junction 46 is equally divided between the R.F. output connection and hybrid junction 47. Since only half of the input power to hybrid junction 46 is available in either of its outputs, there is a power loss of 3 db. Attenuator 50 terminates hybrid junctions 46 and 47. Power arriving at hybrid junction 47 is divided with half, 3 db loss, going to the power meter 53 and half through masking attenuator 51 to video detector diode CR2.

From the above description the following summation can be made:

(1) Output power is at a frequency indicated by frequency dial 71.

(2) Output power level can be set by adjusting the output attenuator 39 and observing the power meter reading. The output attenuator also varies the signal at CR2.

(3) Output power is continuously monitored by power meter 53.

(4) Video output is detected by CR2.

(5) Power indicated by the power meter is 3 db below that at the output wave guide connector.

The operation of the receiving mode of the test set is best explained with reference to FIGURES 6 and 7. When power is applied to the transmitter-receiver unit 44, it is transmitted to three places: power meter 53, crystal detector CR2, and the crystal mixers 35 and 36. This power is equally divided by hybrid junction 46 between attenuator 39 and hybrid junction 47. Thus, the signal input to hybrid junction 47 is 3 db below the input level to the test set. Attenuator 52 is provided to terminate the hybrid junctions 46 and 47.

At hybrid junction 47, the signal is divided so that half of the power goes to power meter 53 and half through masking attenuator 51 to video detector CR2. Thus, the signal to the power meter is 6 db below the output of unit 44.

Directional coupler DC-2, with its 25 db loss, couples an insignificant portion of the power going to the power meter to crystal mixers 35 and 36 where it mixes with the output of the high side band oscillator 22. The heterodyne output of the mixers passes through 60 mc. I.F. amplifier 40 to detector 76. By tuning cavity 14, and therefore, high side band oscillator, for maximum output as indicated by detector 76, the frequency of the incoming signal may be determined. To understand how this action takes place, refer to FIGURE 7. Suppose a signal of unknown frequency is some where between 8500 and 9600 mc. and that the frequency dial is set below the unknown frequency. If dial 71 is turned so that frequency increases, the high side band oscillator will tune likewise and be at a point 60 mc. above the dial reading. When the high side band oscillator is at a point 60 mc. either side of the unknown frequency, I.F. amplifier 40 will put out a maximum signal. This will be indicated by detector 76. With the high side band oscillator below the unknown, the frequency dial will indicate 120 mc. below the unknown frequency, and with the high side band oscillator above the unknown, the frequency dial will agree with the unknown frequency. To make sure that no errors are made in frequency measurements, it is necessary to take the highest frequency dial reading as the correct measurement.

From the above description, the following summation can be made made:

(1) The power meter measures power at a level 6 db less than the input level.

(2) Video output of CR2 may be used to observe pulse shape of the input.

(3) Frequency of the incoming signal can be measured.

The power measuring circuit 53 of FIGURES 1 and 6 measures power in either the transmitting or receiving conditions of the test set as above described. From the drawings, it is apparent that the indication obtained by the power meter is 6 db below the received power level and 3 db below the transmitted power level.

Measurement of R.F. power is obtained by the use of a thermistor which is mounted in the wave guide connections 78 as the power absorbing device. Calibration of the thermistor is accomplished by the use of precise quantities of DC power applied to the thermistor with the R.F. power removed. Temperature compensation is accomplished through the use of a second thermistor mounted close to the power absorbing element, but not subject to the R.F. power.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is therefore to be understood that within the scope of the appended claims the invention may be practiced otherwise than as specifically described. Accordingly, it is desired that the scope of the invention be limited only by the appended claims.

We claim:

1. A test set comprising a variable reference oscillator, control means connected to said oscillator so as to control frequency output of said oscillator, said control means having an indicator means for indicating the output frequency of the oscillator, a first converter means, first coupling means connecting the output of the reference oscillator to an input of said first converter means, said converter means adding a predetermined I.F. to the frequency output of said oscillator, mixed means having first and second input terminals, and an output which has a frequency equal to the difference in frequency of input signals to said first and second input terminals, I.F. amplifier means connected to the output of said mixer means, utilization circuit means connected to an output of said I.F. amplifier means, attenuator means having a signal of a given frequency applied thereto, an output of said converter means being connected to the first input terminal of said mixer, and second coupling means for coupling said signal to the second terminal of said mixer.

2. A test set as set forth in claim 1, wherein said indicator means is a dial which is connected to the control means such that movement of the dial causes the control means to regulate the reference oscillator's output so that its frequency is equal to the dial's frequency indication.

3. A test set as set forth in claim 2, wherein said set operates in microwave frequency range, and wherein said control means consists of a tunable cavity to sense the output of the reference oscillator, and a reference A.F.C. connected to respond to current flow through said tunable cavity.

4. A test set as set forth in claim 1, wherein said utilization circuit means comprises second converter means coupled to the output of the I.F. amplifier means, said second converter means subtracting said predetermined I.F. from the frequency output of said first converter means, and means connecting an output of the second converter means to said attenuator means.

5. A test set as set forth in claim 4, further comprising a power indicator; and means connecting a portion of said signal applied to the attenuator means to said power indicator.

6. A test set as set forth in claim 5, wherein said indicator means is a dial which is connected to the control means such that movement of the dial causes the control means to regulate the reference oscillator's output so that its frequency is equal to the dial's frequency indication.

7. A test set as set forth in claim 6, wherein said control means consists of a transmission tunable cavity to sense the output of the reference oscillator, and reference A.F.C. connected to respond to current flow through said tunable cavity.

8. A variable oscillator system comprising a variable oscillator having control input terminals and power output terminals, an A.F.C. unit having output terminals connected to said input terminals of said oscillator, said A.F.C. unit containing first means connected to the oscillator to cause its output to sweep back and forth through a predetermined range of frequencies, said A.F.C. unit further containing second means connected to the oscillator to cause its output to be frequency modulated by a set amount, and tunable impedance means connected between the output terminal of said oscillator and an input of said A.F.C. unit, whereby an output of said oscillator is applied to the A.F.C. unit only when said oscillator is at a frequency tuned by said tunable impedance means.

9. A variable oscillator system as set forth in claim 8, further comprising a control generator, and wherein said first means is a bistable multivibrator which is controlled by said control generator.

10. A variable oscillator system as set forth in claim 9, wherein said outputs of said oscillator are within the microwave frequency range.

11. A variable oscillator system as set forth in claim 10, wherein said tunable impedance means is a transmission tunable cavity means.

12. A variable oscillator system as set forth in claim 11, further comprising a dial means, wherein said cavity means is tuned by said dial means, and said dial means gives an indication of the frequency at which the cavity means is tuned.

13. A variable oscillator as set forth in claim 10, wherein said second means is a constant oscillator means having a frequency output substantially less than the frequency output of the oscillator.

14. A variable oscillator as set forth in claim 13, wherein said bistable multivibrator is further controlled by a comparing means, said comparing means being connected to the output of the constant oscillator means and to the A.F.C. unit's input so as to compare their polarities, said comparing means having a first output connected to the multivibrator such that it will only cause said multivibrator to have an output of a predetermined first value, said comparing means further having a second output connected to the multivibrator such that it will only cause said multivibrator to have an output of a second predetermined second value, said comparing means having said first output when there is an input to the A.F.C. unit and the output of the constant oscillator means is positive, and said comparing means having said second output when there is an input to the A.F.C. unit and the output of the constant oscillator means is negative.

15. A variable oscillator system as set forth in claim 14, wherein said tunable impedance means is a tunable cavity means.

16. A variable oscillator system as set forth in claim 15, further comprising a dial means, wherein said cavity means is tuned by said dial means, and said dial means gives an indication of the frequency at which the cavity means is tuned.

17. A variable oscillator system as set forth in claim 16, wherein said oscillator contains a klystron having a repeller and a thermal tuning grid, the output of said bistable multivibrator being connected to said thermal tuning grid, and the output of said constant oscillator means being connected to said repeller.

References Cited
UNITED STATES PATENTS 2,681,414   6/1954   Strandberg _____ 331—34 X RODNEY D. BENNETT, *Primary Examiner.*

CHESTER L. JUSTUS, *Examiner.*

T. H. TUBBESING, *Assistant Examiner.*